US011436020B2

(12) United States Patent
Juan et al.

(10) Patent No.: US 11,436,020 B2
(45) Date of Patent: Sep. 6, 2022

(54) SYSTEMS AND METHODS TO BIFURCATE AT LEAST ONE PERIPHERAL COMPONENT INTERCONNECT EXPRESS (PCIE) PORT IN ACCORDANCE WITH A USER-SELECTABLE PCIE BIFURCATION SETTING (71) Applicant: DELL PRODUCTS L.P., Round Rock, TX (US)

(72) Inventors: Chien Yi Juan, New Taipei (TW); Che Nan Cheng, New Taipei (TW); William D. Leara, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/935,058

(22) Filed: Jul. 21, 2020

(65) Prior Publication Data
US 2022/0027165 A1    Jan. 27, 2022

(51) Int. Cl.
G06F 9/4401    (2018.01)
G06F 21/57    (2013.01)
G06F 13/12    (2006.01)
G06F 11/22    (2006.01)

(52) U.S. Cl.
CPC ........ *G06F 9/4403* (2013.01); *G06F 11/2221* (2013.01); *G06F 13/12* (2013.01); *G06F 21/572* (2013.01); *G06F 2213/0026* (2013.01)

(58) Field of Classification Search
CPC .......... G06F 9/4403; G06F 2213/0026; G06F 13/12; G06F 11/2221; G06F 21/572
See application file for complete search history.

(56) References Cited

U.S. PATENT DOCUMENTS

| | | | |
|---|---|---|---|
| 7,934,032 B1 * | 4/2011 | Sardella | G06F 13/4022 710/104 |
| 10,002,093 B1 * | 6/2018 | Phong | G06F 13/28 |
| 10,445,279 B1 * | 10/2019 | Itkin | G06F 9/44505 |
| 10,474,612 B1 * | 11/2019 | Guevara | G06F 13/4027 |
| 10,545,769 B2 | 1/2020 | Arms et al. | |
| 10,916,326 B1 * | 2/2021 | Holmberg, Jr | G06F 11/0793 |

(Continued)

*Primary Examiner* — Raymond N Phan
(74) *Attorney, Agent, or Firm* — Egan, Enders & Huston LLP.

(57) ABSTRACT

Systems and methods disclosed herein provide a novel solution for PCIe port bifurcation. Unlike conventional client systems, which rely on resistors, jumpers or DIP switches, the disclosed systems and methods enable PCIe ports to be configured in accordance with a plurality of user-selectable PCIe bifurcation settings provided within a boot setup menu. When an "Auto" setting is selected in the boot setup menu, the disclosed systems and methods enable PCIe ports to be: (a) configured in accordance with the bifurcation requirements of the PCIe adapter card(s) connected to the PCIe ports, and (b) automatically reconfigured when bifurcation requirements change. Unlike conventional server systems, which require the user to enter BIOS setup and manually change the PCIe bifurcation settings provided in the BIOS setup menu, the systems and methods disclosed herein enable PCIe ports to be automatically reconfigured, when bifurcation requirements change, without user intervention.

20 Claims, 5 Drawing Sheets (56) References Cited

U.S. PATENT DOCUMENTS

| | | | |
|---|---|---|---|
| 10,929,320 B1* | 2/2021 | Chou | G06F 13/20 |
| 2012/0260015 A1* | 10/2012 | Gay | G06F 13/409 |
| | | | 710/301 |
| 2017/0090949 A1* | 3/2017 | Arms | G06F 9/4403 |
| 2017/0116090 A1* | 4/2017 | Arroyo | G06F 11/1616 |
| 2017/0371823 A1* | 12/2017 | Pearson | G06F 13/409 |
| 2018/0341497 A1* | 11/2018 | Perez Guevara | G06F 9/4403 |
| 2019/0286602 A1* | 9/2019 | Remis | G06F 9/44505 |
| 2020/0349103 A1* | 11/2020 | Luong | G06F 9/4401 |
| 2020/0394076 A1* | 12/2020 | Chan | G06F 9/5022 |
| 2021/0026797 A1* | 1/2021 | Barbiero | G06F 13/40 |
| 2021/0263875 A1* | 8/2021 | Lin | G06F 13/385 |

* cited by examiner

SYSTEMS AND METHODS TO BIFURCATE AT LEAST ONE PERIPHERAL COMPONENT INTERCONNECT EXPRESS (PCIE) PORT IN ACCORDANCE WITH A USER-SELECTABLE PCIE BIFURCATION SETTING

FIELD

This invention relates generally to information handling systems (IHSs), and more particularly, to IHSs that include Peripheral Component Interconnect Express (PCIe) ports.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (IHSs), such as servers, desktop personal computers (PCs) and mobile PCs, include Peripheral Component Interconnect Express (PCIe) interfaces and ports for connecting and communicating with PCIe-compatible devices. In some information handling systems, a number of PCIe ports (or slots) may be included on the system motherboard, along with one or more processing devices (e.g., one or more central processing units (CPUs), GPUs, etc.), a platform controller hub (PCH) and other hardware components. Each PCIe port may be configured to receive a PCIe adapter card comprising one or more PCIe devices. Examples of PCIe devices include, but are not limited to, video cards, sound cards, non-volatile memory cards, network interface cards (NICs), hardware RAID controllers, solid state drives (SSDs), graphics processing units (GPUs), etc.

In the PCIe bus architecture, PCIe devices are connected via a network of serial connections called "links" or "buses." A PCIe link (or bus) is a point-to-point communication channel between two PCIe ports and includes one or more "lanes" (e.g., 1, 4, 8, 12, 16 or 32 lanes). Each lane is composed of two differential signal pairs, one for receiving data and the other for transmitting data. PCIe ports and PCIe adapter cards can be configured with 1, 4, 8, 12, 16 or 32 lanes, and are generally designated in terms of lane width using the prefix "x". For example, an "x16 port" is a PCIe port comprising 16 lanes, an "x8 port" is a PCIe port comprising 8 lanes, etc. Likewise, an "x8 card" is a PCIe adapter card comprising 8 lanes, an "x4 card" is a PCIe adapter card comprising 4 lanes, etc. In general, a PCIe adapter card may fit into a PCIe port of its physical size or larger. For example, an x8 PCIe adapter card may fit within an x8, x16 or x32 PCIe port, but will not fit within an x4, or x1 PCIe port.

Because information handling systems include a limited number of PCIe ports, they are generally restricted to supporting a limited number of PCIe adapter cards and devices. To increase the number of supported PCIe adapter cards, some information handling systems provide support for PCIe bifurcation. PCIe bifurcation is a process whereby a PCIe port (e.g., an x16 PCIe port or an x32 PCIe port) is bifurcated, or split, into two or more ports of smaller lane width. For example, an x16 PCIe port may be split into two (2) x8 PCIe ports, or one (1) x8 PCIe port and two (2) x4 PCIe ports. PCIe bifurcation enables a larger PCIe port (e.g., an x16 PCIe port or an x32 PCIe port) to support multiple PCIe adapter cards having smaller lane width requirements, thereby enabling additional PCIe adapter cards to be added to the system.

Each time an information handling system is powered on or rebooted, an IHS processing device executes boot firmware (e.g., system BIOS or UEFI) to test and initialize IHS hardware components, perform a Power-On Self-Test (POST) to ensure the hardware configuration is valid and working properly, load an operating system (OS) from a computer readable storage device, and/or perform a variety of other actions known in the art. Before entering POST, the boot firmware allocates PCIe bus resources to the host processor and any PCIe ports provided on the system motherboard, and configures the PCIe ports using hardware and/or firmware options. During POST, the boot firmware detects and enumerates all PCIe devices included within the system, so that system software (such as, e.g., the operating system, device drivers, applications, etc.) can address and access the PCIe devices during OS runtime.

Some information handling systems, such as server systems, enable PCIe ports to be configured according to default or user selected PCIe bifurcation options provided in a BIOS setup menu. Before entering POST, the server BIOS may configure one or more PCIe ports according to a PCIe bifurcation option selected in the BIOS setup menu by writing to configuration registers contained within the server's central processing unit (CPU). To select a different PCIe bifurcation option, the user must enter BIOS setup and manually change the PCIe bifurcation option. This requires user action/expertise to enter BIOS setup and manually change/reconfigure the PCIe bifurcation option.

The configuration registers mentioned above are only provided in CPUs designed for server systems and are not provided in client systems, such as desktop systems, laptop systems, etc. Unlike server systems, client systems (such as desktop computers and mobile PCs) utilize hardware solutions to provide PCIe bifurcation support. Examples of hardware solutions include pull up/pull down resistors, jumpers or DIP switches, which may be provided on the system motherboard of a client system to set/determine configuration signals that are utilized for PCIe bifurcation. Some Intel CPUs designed for client systems, for example, supply configuration signals (e.g., CFG[5] and CFG[6]) to the CPU's PCIe interface to configure PCIe bifurcation. These configuration signals are set/determined by the hardware solutions mentioned above, and either cannot be changed or are prone to user error. For example, pull up/pull down resistors are hard-coded at motherboard design time and cannot be changed. Although jumpers or DIP switches can be changed, this method is highly prone to error, since it requires the user to read the user manual, open the chassis, locate the appropriate jumpers or DIP switches and make the right selection.

PCIe adapter cards may be added to, removed from or relocated within an information handling system. In some cases, changes made to the PCIe adapter cards may require PCIe bifurcation settings to be changed. On server systems, PCIe bifurcation can be changed by entering BIOS setup and manually changing the PCIe bifurcation option in the BIOS setup menu. This option is not available on client systems. On client systems, the hardware solutions typically provided to support PCIe bifurcation either cannot be changed (pull up/pull down resistors) or are prone to user error (jumpers or DIP switches). None of the solutions currently provided on servers or client systems are able detect changes made to PCIe adapter cards and automatically reconfigure PCIe bifurcation settings based on such changes.

SUMMARY OF THE INVENTION

The following description of various embodiments of information handling systems and related methods is not to be construed in any way as limiting the subject matter of the appended claims.

The systems and methods disclosed herein provide a novel solution for PCIe bifurcation support on both server and client systems. Unlike conventional client systems, which rely on resistors, jumpers or DIP switches to statically set the configuration (CFG) signals used to configure a PCIe port for bifurcation, the systems and methods described herein enables PCIe ports within client systems (such as desktop PCs and mobile PCs) and server systems to be configured in accordance with a plurality of user-selectable PCIe bifurcation settings provided within a boot setup menu. When the "Auto" setting is selected in the boot setup menu, the systems and methods disclosed herein enable PCIe ports within client systems and server systems to be: (a) configured in accordance with the bifurcation requirements of the PCIe adapter card(s) connected to the PCIe ports, and (b) automatically reconfigured when bifurcation requirements change. Unlike conventional server systems, which require the user to enter BIOS setup and manually change the PCIe bifurcation settings provided in the BIOS setup menu, the systems and methods disclosed herein enable PCIe ports to be automatically reconfigured, when bifurcation requirements change, without user intervention.

According to one embodiment, an information handling system (IHS) in accordance with the present disclosure may generally include at least one Peripheral Component Interconnect Express (PCIe) port, a host processor having a PCIe interface coupled to the at least one PCIe port, and an embedded controller (EC) coupled to the configuration pins of the PCIe interface. When the IHS is powered on or rebooted, the EC may initiate a boot process for the IHS and execute program instructions early in the boot process before the host processor comes out of reset to detect a user-selectable PCIe bifurcation setting and drive configuration signals, which are supplied to the configuration pins of the PCIe interface to configure the at least one PCIe port in accordance with the user-selectable PCIe bifurcation setting.

The information handling system may also include a non-volatile computer readable memory for storing boot firmware and a boot setup menu. The boot setup menu may comprise a plurality of user-selectable PCIe bifurcation settings, including multiple static PCIe bifurcation settings and one automatic PCIe bifurcation setting for configuring the at least one PCIe port.

In some embodiments, the at least one PCIe port may be an ×16 port, and the multiple static PCIe bifurcation settings may include a 1×16 setting, a 2×8 setting and a 1×8+2×4 setting. When the 1×16 setting is selected in the boot setup menu, the EC may drive the configuration signals supplied to the configuration pins of the PCIe interface to configure the at least one PCIe port to its maximum lane width. When the 2×8 setting is selected in the boot setup menu, the EC may drive the configuration signals supplied to the configuration pins of the PCIe interface to bifurcate the at least one PCIe port into two ×8 ports. When the 1×8+2×4 setting is selected in the boot setup menu, the EC may drive the configuration signals supplied to the configuration pins of the PCIe interface to bifurcate the at least one PCIe port into one ×8 port and two ×4 ports. It is recognized, however, that boot setup menu may include additional static PCIe bifurcation settings for configuring larger PCIe ports (e.g., an ×32 port, etc.) and/or additional static PCIe bifurcation settings for configuring additional PCIe ports.

When the automatic PCIe bifurcation setting is selected in the boot setup menu, the EC may drive the configuration signals supplied to the configuration pins of the PCIe interface to configure the at least one PCIe port according to a saved configuration setting, which was used to configure the at least one PCIe port during a previous boot process. In some embodiments, the saved configuration setting may be stored within a non-volatile memory coupled to, or provided within, the EC.

After the host processor comes out of reset, the host processor may execute program instructions within the boot firmware to determine if at least one PCIe adapter card is connected to the at least PCIe port. When the automatic PCIe bifurcation setting is selected in the boot setup menu, the host processor may execute further program instructions within the boot firmware to detect changes in bifurcation requirements of the at least one PCIe adapter card, and automatically reconfigure the at least one PCIe port if changes are made to the bifurcation requirements of the at least one PCIe adapter card. If changes are made to the bifurcation requirements of the at least one PCIe adapter card, the boot firmware may automatically reconfigure the at least one PCIe port by storing a new configuration setting within a non-volatile memory coupled to, or provided within, the EC. When the IHS is subsequently rebooted, the EC may read the new configuration setting stored within the non-volatile memory and drive the configuration signals, which are supplied to the configuration pins of the PCIe interface to configure the at least one PCIe port in accordance with the new configuration setting.

In some embodiments, the information handling system may be a client system. In other embodiments, the information handling system may be a server system.

According to another embodiment, a computer-implemented method executed by an embedded controller (EC) of an information handling system (IHS) is provided herein. The IHS may further include a host processor and at least one PCIe port, which is coupled to a PCIe interface provided within the host processor. In this embodiment, the computer-implemented method may generally include detecting a PCIe bifurcation setting selected from a plurality of PCIe bifurcation settings provided in a boot setup menu, and supplying configuration signals to the PCIe interface to configure the at least one PCIe port in accordance with the selected PCIe bifurcation setting. The steps of detecting and supplying may be performed by the EC, each time the IHS is booted, before the host processor comes out of reset.

The boot setup menu may include multiple static PCIe bifurcation settings and one automatic PCIe bifurcation setting. In some embodiments, the multiple static PCIe bifurcation settings may include a first bifurcation setting, a second bifurcation setting and a third bifurcation setting. When the first bifurcation is detected, the EC may supply the configuration signals to the PCIe interface to configure the at least one PCIe port to its maximum lane width. When the second bifurcation is detected, the EC may supply the configuration signals to the PCIe interface to bifurcate the at least one PCIe port into two ports. When the third bifurcation is detected, the EC may supply the configuration signals to the PCIe interface to bifurcate the at least one PCIe port into three ports. When the automatic PCIe bifurcation setting is detected, the EC may supply the configuration signals to the PCIe interface to configure the at least one PCIe port according to a saved configuration setting, which was used to configure the at least one PCIe port during a previous boot process.

According to another embodiment, a computer-implemented method executed by a host processor of an information handling system (IHS) is provided herein. The IHS may further include an embedded controller (EC) and at least one PCIe port, which is coupled to a PCIe interface provided within the host processor. The computer-implemented method disclosed in this embodiment may be performed by the host processor after the host processor comes out of reset. In this embodiment, the computer-implemented method may generally include discovering at least one PCIe port coupled to the PCIe interface of the host processor, determining bifurcation requirements of one or more PCIe adapter cards connected to the at least one PCIe port, determining if the bifurcation requirements of the one or more PCIe adapter cards have changed, and automatically reconfiguring the at least one PCIe port if changes are made to the bifurcation requirements of the one or more PCIe adapter cards.

In some embodiments, the at least one PCIe port may by automatically reconfigured by creating a bifurcation variable containing a configuration setting, which is used by EC to configure the at least one PCIe port based on the bifurcation requirements, sending the bifurcation variable to the EC for storage within a non-volatile memory coupled to, or provided within, the EC, and rebooting the IHS. When the IHS is rebooted, the EC may read the bifurcation variable stored within the non-volatile memory and supply configuration signals to the PCIe interface to configure the at least one PCIe port in accordance with the configuration setting contained within the bifurcation variable.

BRIEF DESCRIPTION OF THE DRAWINGS

Other advantages of the present disclosure will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Figure 1:
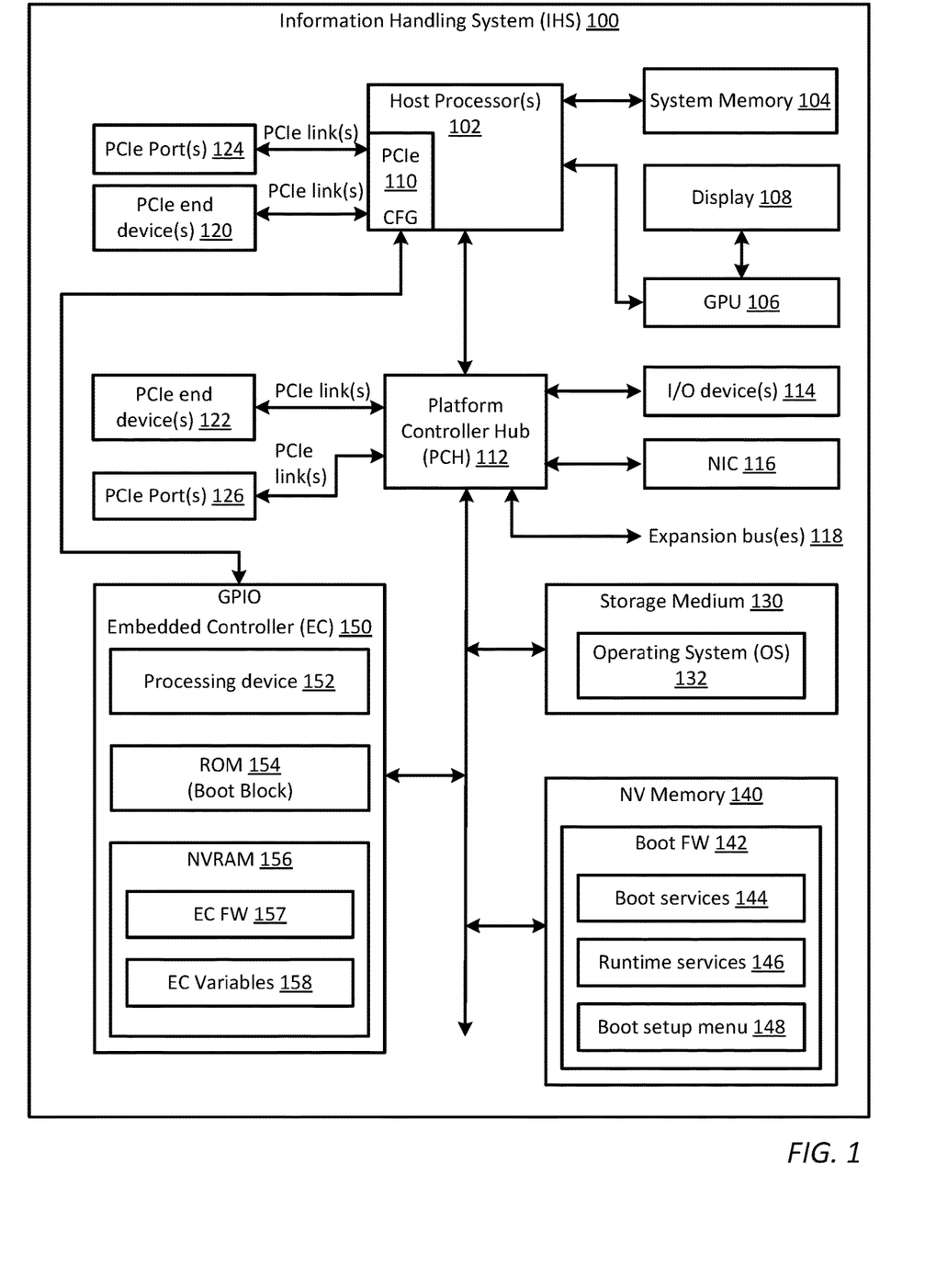
FIG. 1 is a block diagram illustrating one embodiment of an information handling system (IHS) in accordance with the present disclosure.
Figure 2:
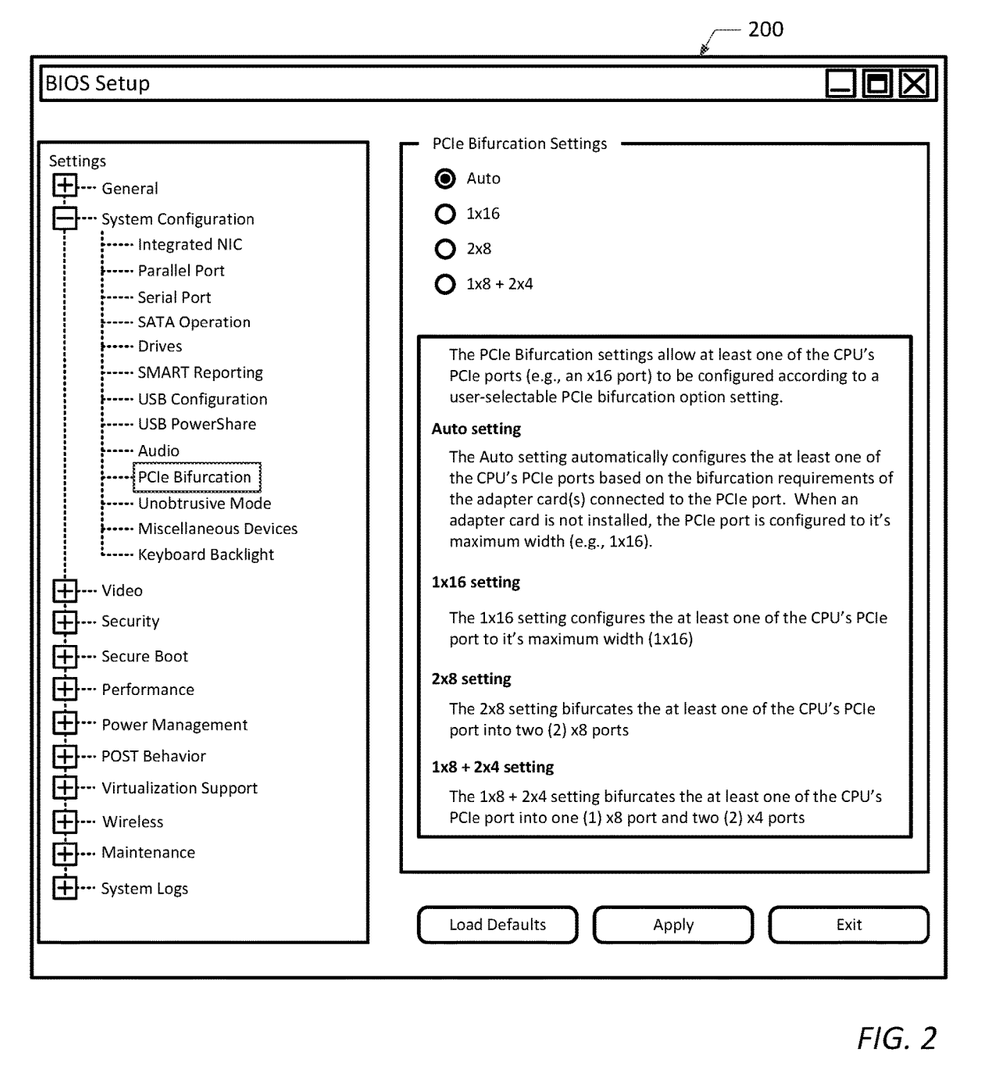
FIG. 2 is a graphical diagram of a boot setup menu including a plurality of user-selectable PCIe bifurcation settings for configuring a PCIe port.

FIG. 1 is a block diagram of an information handling system (IHS) 100 as it may be configured according to one embodiment of the present disclosure. As shown in FIG. 2, IHS 100 may generally include at least one host processor 102, a system memory 104, a graphics processor unit (GPU) 106, a display device 108, a platform controller hub (PCH) 112, input/output (I/O) devices 114, a network interface card (NIC) 118, expansion bus(es) 118, Peripheral Component Interconnect Express (PCIe) end device(s) 120, 122, a plurality of PCIe ports 124, 126, a computer readable storage medium 130, and a computer readable non-volatile (NV) memory 140 and an embedded controller (EC) 150. As described in more detail below, computer readable NV memory 140 and EC 150 may each contain firmware (e.g., boot firmware 142 and EC firmware 157), which is executable by the host processor 102 and the EC 150 to detect PCIe adapter cards included within the system and to configure at least one of the PCIe ports 124 coupled to the host processor 102 based on a user-selectable PCIe bifurcation setting and/or the PCIe adapter cards connected to the at least one of the PCIe ports 124.

It is expressly noted that the IHS configuration shown in FIG. 1 is exemplary only, and that the methods disclosed herein may be implemented on any type and/or configuration of information handling system having at least one processing device (e.g., host processor 102, embedded controller 150, microcontroller, etc.) for executing firmware to detect PCIe adapter cards included within the IHS and to configure at least one of the PCIe ports 124 coupled to the host processor 102 based on a user-selectable PCIe bifurcation setting and/or the PCIe adapter cards connected to the at least one of the PCIe ports 124. It will be further understood that while certain components of the information handling system are shown in FIG. 1 for illustrating embodiments of the present disclosure, the information handling system disclosed herein is not restricted to including only those components shown in FIG. 1 and described below.

The at least one host processor 102 shown in FIG. 1 may include various types of programmable integrated circuits (e.g., a processor such as a controller, microcontroller, microprocessor, ASIC, etc.) and programmable logic devices (such as a field programmable gate array "FPGA", complex programmable logic device "CPLD," etc.). According to one embodiment, at least one host processor 102 may include one or more central processing units (CPUs), each having one or more processing cores. In some embodiments, host processor(s) 102 may include two CPU's, each having one or more processing cores. The CPU(s) may include any type of processing device, such as an Intel processor, an Advanced Micro Devices (AMD) processor or another processing device. In one example embodiment, the at least one host processor 102 may be an Intel desktop CPU.

As shown in FIG. 1, the PCIe interface 110 within host processor(s) 102 may be coupled to one or more PCIe end devices 120 via one or more PCIe links. A number of PCIe ports 124 may also be coupled to the PCIe interface 110 included within the host processor(s) 102. Each PCIe port 124 may be generally configured to receive one or more PCIe adapter cards, which may be added by a manufacturer, value added reseller (VAR) or end user to expand the functionality provided within the information handling system. Examples of PCIe adapter cards and end devices that may be coupled to the PCIE interface 110 of host processor(s) 102 include, but are not limited to CPU storage devices and PCIe adapter cards comprising PCIe-compatible GPUs solid-state drives (SSDs).

The PCIe ports 124 shown in FIG. 1 may include substantially any number of lanes (e.g., 1, 4, 8, 12, 16 or 32). In some embodiments, the PCIe ports 124 shown in FIG. 1 may each have the same lane width (e.g., all PCIe ports may be ×16 ports). In other embodiments, the PCIe ports 124 may comprise a plurality of different lane widths. For example, PCIe ports 124 may comprise a plurality of PCIe ports selected from any combination of ×1, ×4, ×8, ×12, ×16, or ×32 ports.

In the embodiments disclosed herein, at least one of the PCIe ports 124 may have a larger lane width (e.g., an ×16 or ×32 PCIe port), which may be bifurcated (or split) into two or more ports of smaller lane width. For example, at least one of the PCIe ports 124 may be an ×16 port, which may be split into two (2) ×8 ports, or one (1) ×8 port and two (2) ×4 ports. As noted above, bifurcating a larger PCIe port (e.g., an ×16 or ×32 port) into two or more smaller PCIe ports is often desirable, as it enables additional PCIe adapter cards to be added to the system. As shown in FIG. 1 and described in more detail below, embedded controller 150 may be coupled for driving configuration (CFG) signals, which are supplied to the PCIe interface 110 for configuring at least one of the PCIe ports 124 in accordance with a user-selectable PCIe bifurcation setting.

System memory 104 is coupled to host processor 102 and generally configured to store program instructions, which are executable by host processor(s) 102. System memory 104 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

GPU 106 is configured to coordinate communication between the host processor(s) 102 and one or more display components of the IHS. In the embodiment shown in FIG. 2, GPU 106 is coupled to display device 108 to provide visual images to the user. In some embodiments, GPU 106 may be configured to display a graphical user interface (e.g., a BIOS setup menu) on display device 108, which enables the user to select (using an input/output device 114) one of a plurality of PCIe bifurcation setting s. Display device 108 may be a display screen embedded within the chassis of the IHS, or an external display screen or monitor coupled to the IHS. In some embodiments, GPU 106 may be implemented as a PCIe end device, which communicates with host processor(s) 102 via PCIe interface 110 and a PCIe link.

Platform controller hub (PCH) 112 is connected to host processor(s) 102 and configured to handle I/O operations for the IHS. As such, PCH 112 may include a variety of communication interfaces, ports and pins for communicating with various IHS components, such as I/O devices 114, NIC 116, expansion bus(es) 118, PCIe end device(s) 122, PCIe port(s) 124, 126, computer readable storage medium 130, and computer readable NV memory 140. Examples of communication interfaces, ports and pins that may be included within PCH 112 include, but are not limited to, a Peripheral Component Interconnect (PCI) interface, a PCI-Express (PCIe) interface, a High Speed I/O (HSIO) interface, a Serial Peripheral Interface (SPI), an Enhanced SPI (eSPI), a Serial AT Attachment (SATA) interface, a Direct Media Interface (DMI), a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface, a Thunderbolt™ interface and a number of General Purpose Input/Output (GPIO) pins. Examples of expansion bus(es) 118 that may be coupled to PCH 112 include, but are not limited to, a PCI bus, a PCIe bus, a SATA bus, a USB bus, etc. Examples of PCIe end devices 122 that may be coupled to PCH 112 include, but not limited to, PCIe video cards, sound cards, small system computer interface (SCSI) controllers, hardware RAID controllers, NICs, serial/parallel port cards, IEEE 1394 cards, Thunderbolt™ cards, USB controller cards, SATA/eSATA controller cards, PS/2 controller cards, non-volatile memory cards, PCH storage, etc.

I/O devices 114 enable a user to interact with IHS 100. In some embodiments, one or more I/O devices 114 may be present within, or coupled to, IHS 100. In some embodiments, I/O device(s) 114 may be separate from the IHS and may interact with the IHS through a wired or wireless connection. Examples of I/O devices 114 include, but are not limited to, keyboards, keypads, touch screens, scanning devices, voice or optical recognition devices, and any other devices suitable for entering or retrieving data. In some embodiments, a user may use one or more of I/O devices 114 to select one of a plurality of PCIe bifurcation options, which are provided within a graphical user interface (e.g., a BIOS setup menu) displayed upon display device 108.

NIC 116 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof. NIC 116 may communicate data and signals to/from IHS 100 using any known communication protocol.

Computer readable storage medium 130 may be any type of persistent, non-transitory computer readable storage medium, such as one or more hard disk drives (HDDs) or solid-state drives (SSDs), and may be generally configured to store software and/or data. In some embodiments, computer readable storage medium 130 may store an operating system (OS) 132 for the IHS, in addition to one or more user applications and data. OS 132 may generally contain program instructions (or computer program code), which may be executed by host processor(s) 102 to perform various tasks and functions for the information handling system and/or for the user.

Computer readable memory 140 may include any type of non-volatile (NV) memory including, but not limited to, read-only memory (ROM), flash memory, and non-volatile random access memory (NVRAM), and may be generally configured to store software and/or firmware modules. The software and/or firmware modules stored within computer readable NV memory 140 may generally contain program instructions (or computer program code), which may be executed by host processor(s) 102 to instruct components of IHS 100 to perform various tasks and functions for the information handling system. For example, NV memory 140 may store boot firmware (FW) 142, in addition to other software and/or firmware modules. As known in the art, boot firmware 142 includes software and/or firmware modules for specifying hardware configuration settings, system date/time, boot sequence, etc. In some embodiments, the boot firmware 142 shown in FIG. 1 may be implemented as a Basic Input/Output System (BIOS) and/or a Unified Extensible Firmware Interface (UEFI).

As shown in FIG. 1, boot firmware 142 may include a variety of boot services 144, runtime services 146 and a boot setup menu 148, which enables a user to select various system configuration settings. Boot services 144 are available for execution when boot firmware 142 owns the system platform during a pre-boot phase of the boot firmware before OS 132 is loaded and running. Runtime services 146, on the other hand, are available for execution while the OS is running (i.e., during OS runtime). The boot setup menu 148 is accessible during the pre-boot phase and enables a user to view, change and restore various information handling system settings.

The boot setup menu 148 includes a plurality of PCIe bifurcation settings, which may be used to configure at least one of the PCIe ports 124 coupled to the host processor 102. The PCIe bifurcation settings provided within the boot setup menu 148 are "user-selectable," in that they may be viewed, changed or restored to default settings by a user of the IHS 100. In some embodiments, the number of user-selectable PCIe bifurcation settings provided within the boot setup menu 148 may generally depend on the number of PCIe ports 124 enabled for bifurcation and the number of lanes provided within such ports. In one example embodiment, boot setup menu 148 may include three static PCIe bifurcation settings and one dynamic (or automatic) PCIe bifurcation setting for an ×16 PCIe port. It is recognized, however, that boot setup menu 148 may include a greater number of PCIe bifurcation settings for configuring larger PCIe ports (e.g., an ×32 port, etc.) and/or additional PCIe bifurcation settings for configuring additional PCIe ports.

FIG. 2 illustrates one embodiment of a BIOS setup menu 200, which enables users to view, change and restore various information handling system settings. As shown in FIG. 2, BIOS setup menu 200 includes a plurality of user-selectable PCIe bifurcation settings (under the System Configuration tab), which may be used to configure at least one of the PCIe ports 124 coupled to the host processor 102. In the example embodiment shown in FIG. 2, BIOS setup menu 200 provides four user-selectable PCIe bifurcation settings, including an "Auto" setting, a "1×16" setting, a "2×8" setting and a "1×8+2×4" setting, for configuring an ×16 PCIe port. Although an example embodiment is shown in FIG. 2, one skilled in the art would understand that BIOS setup menu 200 may include a greater number of PCIe bifurcation settings for configuring PCIe ports having larger lane widths (e.g., 32 lanes or more) and/or may include additional PCIe bifurcation settings if more than one PCIe port supporting bifurcation is provided.

The "1×16," "2×8," and "1×8+2×4" settings provided within the BIOS setup menu 200 are static PCIe bifurcation settings, which enable a user to select a particular bifurcation setting for the at least one of the PCIe ports 124. When the at least one PCIe port 124 is an ×16 PCIe port, the "1×16" setting configures the ×16 PCIe port to its maximum lane width (1×16). When the "2×8" setting is selected, the ×16 PCIe port is bifurcated into two (2) ×8 ports. when the "1×8+2×4" setting is selected, the ×16 PCIe port is bifurcated into one (1) ×8 port and two (2) ×4 ports. Other static PCIe bifurcation settings may be provided for PCIe ports having different lane widths.

When the "Auto" setting is selected, the at least one PCIe port 124 may be initially configured according to a saved configuration, which was previously stored as bifurcation variable and used at the last system boot. The "Auto" setting may also be used to detect changes in the bifurcation requirements of PCIe adapter card(s)/devices connected to at least one of the PCIe ports 124, and to automatically reconfigure the at least one PCIe port 124 based on the changes made to the bifurcation requirements. When bifurcation requirements change, a new bifurcation variable specifying the new configuration may be stored and used to reconfigure the at least one PCIe port 124 when the system is rebooted.

Embedded controller (EC) 150 may be generally configured to boot the information handling system and perform other functions. As shown in FIG. 1, EC 150 includes read only memory (ROM) 154 for storing a boot block, non-volatile random access memory (NVRAM) 156 for storing EC firmware 157, and a processing device 152 for executing program instructions stored locally in ROM 154 and NVRAM 156. Although not strictly limited to such, processing device 152 may be implemented as a programmable integrated circuit (e.g., a controller, microcontroller, microprocessor, ASIC, etc., or as a programmable logic device "PLD" such as FPGA, complex programmable logic device "CPLD", etc.), in one embodiment.

When IHS 100 is powered on or rebooted, the processing device 152 within EC 150 may initiate a boot process for the information handling system by executing the boot block stored within ROM 154. A "boot process" is a process or set of operations performed by one or more information handling system components to load and execute a boot system and prepare the information handling system for OS booting. Early in the boot process (e.g., before the PCH 120 and host processor 102 come out of reset), processing device 152 may execute program instructions within EC firmware 157 to detect a user-selectable PCIe bifurcation setting and drive the configuration (CFG) signals, which are supplied to PCIe interface 110 for configuring at least one of the PCIe ports 124 in accordance with the user-selectable PCIe bifurcation setting.

In the embodiment shown in FIG. 1, GPIO pins on EC 150 may be coupled to configuration (CFG) pins on PCIe interface 110 for supplying the configuration signals needed to set/determine bifurcation. In one example embodiment, host processor 102 may be implemented as an Intel processor. In such an embodiment, EC 150 may supply the bifurcation configuration signals to the CFG[5] and CFG[6] pins provided on the PCIe interface 110 of host processor 102.

EC 150 may supply various configuration signals to the CFG[5] and CFG[6] pins of PCIe interface 110 to configure the at least one PCIe port 124 in accordance with the user-selectable PCIe bifurcation setting. If a static PCIe bifurcation setting is selected, EC 150 may drive the CFG[5] and CFG[6] pins with predetermined logic values. When the "1×16" setting is selected, for example, EC 150 supply logic '1' values to the CFG[5] pin and the CFG[6] pin to set the bifurcation to 1×16. When the "2×8" setting is selected, EC 150 may supply a logic '0' value to the CFG[5] pin and a logic '1' value to the CFG[6] pin to set the bifurcation to 2×8. When the "1×8 and 2×4" setting is selected, EC 150 may supply logic '0' values to the CFG[5] pin and the CFG[6] pin to set the bifurcation to 1×8 and 2×4. In some embodiments, additional configuration signals may be supplied to the CFG[5] and CFG[6] pins to configure the at least one PCIe port 124 in accordance additional PCIe bifurcation setting(s). For example, EC 150 may supply a logic 'n' configuration signal to the CFG[5] pin and a logic 'n' configuration signal to the CFG[6] pin to set the bifurcation to n.

If a dynamic (or automatic) PCIe bifurcation setting is selected, such as the "Auto" setting shown in FIG. 2, EC 150 may drive the configuration signals supplied to the CFG[5] and CFG[6] pins according to a saved configuration setting, which was previously stored as a bifurcation variable and used at the last system boot. In some embodiments, the bifurcation variable may be stored within NVRAM 156 as an EC variable 158. If a PCIe adapter card is not connected to the PCIe port, the Auto setting may configure the PCIe port to its maximum lane width.

If a PCIe adapter card is connected to a PCIe port and the "Auto" setting is selected, EC 150 may read the bifurcation variable stored within NVRAM 156 and drive the configuration signals supplied to the CFG[5] and CFG[6] pins accordingly. For example, if the bifurcation variable stored within NVRAM 156 indicates that the at least one PCIe port 124 was configured as an ×16 port at the last system boot, EC 150 may drive the CFG[5] pin and the CFG[6] pin with logic '1' values to set the bifurcation to 1×16 before the PCH 120 and host processor 102 come out of reset.

When PCH 120 and host processor 102 come out of reset, host processor 102 retrieves the boot firmware 142 stored within NV memory 140, stores a local copy of the boot firmware 142 within system memory 104 and executes program instructions within the boot firmware 142 to configure hardware components of the IHS, perform a Power-On Self-Test (POST), discover and initialize devices and launch a bootloader to load OS 132.

During POST, boot firmware 142 is executed by host processor 102 to detect and enumerate all PCIe adapter cards/devices provided within the system. After POST is performed and before the bootloader is launched, a boot service 144 included within boot firmware 142 may be executed by host processor 102 (or another processing device) to detect changes in the bifurcation requirements of PCIe adapter card(s)/devices connected to at least one of the PCIe ports 124, and to automatically reconfigure the at least one PCIe port 124 based on the changes made to the bifurcation requirements.

As noted above, PCIe adapter cards may be added to, removed from or relocated within an information handling system. For example, a second PCIe adapter card may be added to a PCIe port, or a PCIe adapter card may be exchanged for another card having different bifurcation requirements. In some cases, changes made to the PCIe adapter cards may require PCIe bifurcation settings of the PCIe port to be changed. For example, a mass storage controller card having two solid-state drives (SSDs) may be connected to an ×16 PCIe port. If each SSD requires 8 PCIe lanes, the ×16 PCIe port must be bifurcated into two (2) ×8 ports to enable concurrent operation of, and provide sufficient lane width to, each SSD.

When the "Auto" setting is selected and changes are made to the bifurcation requirements of the attached PCIe adapter card(s)/devices, boot service 144 detects the changes made to the bifurcation requirements and automatically reconfigures the PCIe port accordingly. For example, if a mass storage controller card having two SSDs is connected to an ×16 PCIe port and the Auto setting is selected, boot service 144 may store a new bifurcation variable within NVRAM 156 to reconfigure the ×16 port into two ×8 ports. When the system is rebooted, EC 150 may read the bifurcation variable stored within NVRAM 156 and drive the configuration signals supplied to the CFG[5] and CFG[6] pins to automatically reconfigure the ×16 port into two ×8 ports.

Unlike conventional client systems, which rely on resistors, jumpers or DIP switches to statically set the configuration (CFG) signals used to configure a PCIe port for bifurcation, the information handling system shown in FIG. 1 and the BIOS setup menu shown in FIG. 2 enables PCIe ports within client systems (such as desktop PCs and mobile PCs) to be configured in accordance with a plurality of user-selectable PCIe bifurcation settings. When the "Auto" setting is selected in the BIOS setup menu 200, the information handling system shown in FIG. 1 enables PCIe ports within client systems to be: (a) configured in accordance with the bifurcation requirements of the PCIe adapter card(s)/device(s) connected to the PCIe ports, and (b) automatically reconfigured when bifurcation requirements change. Unlike conventional server systems, which require the user to enter BIOS setup and manually change the PCIe bifurcation settings provided in the BIOS setup menu, the information handling system shown in FIG. 1 and the "Auto" setting described herein enables PCIe ports to be automatically reconfigured, when bifurcation requirements change, without user intervention.

Figure 3:
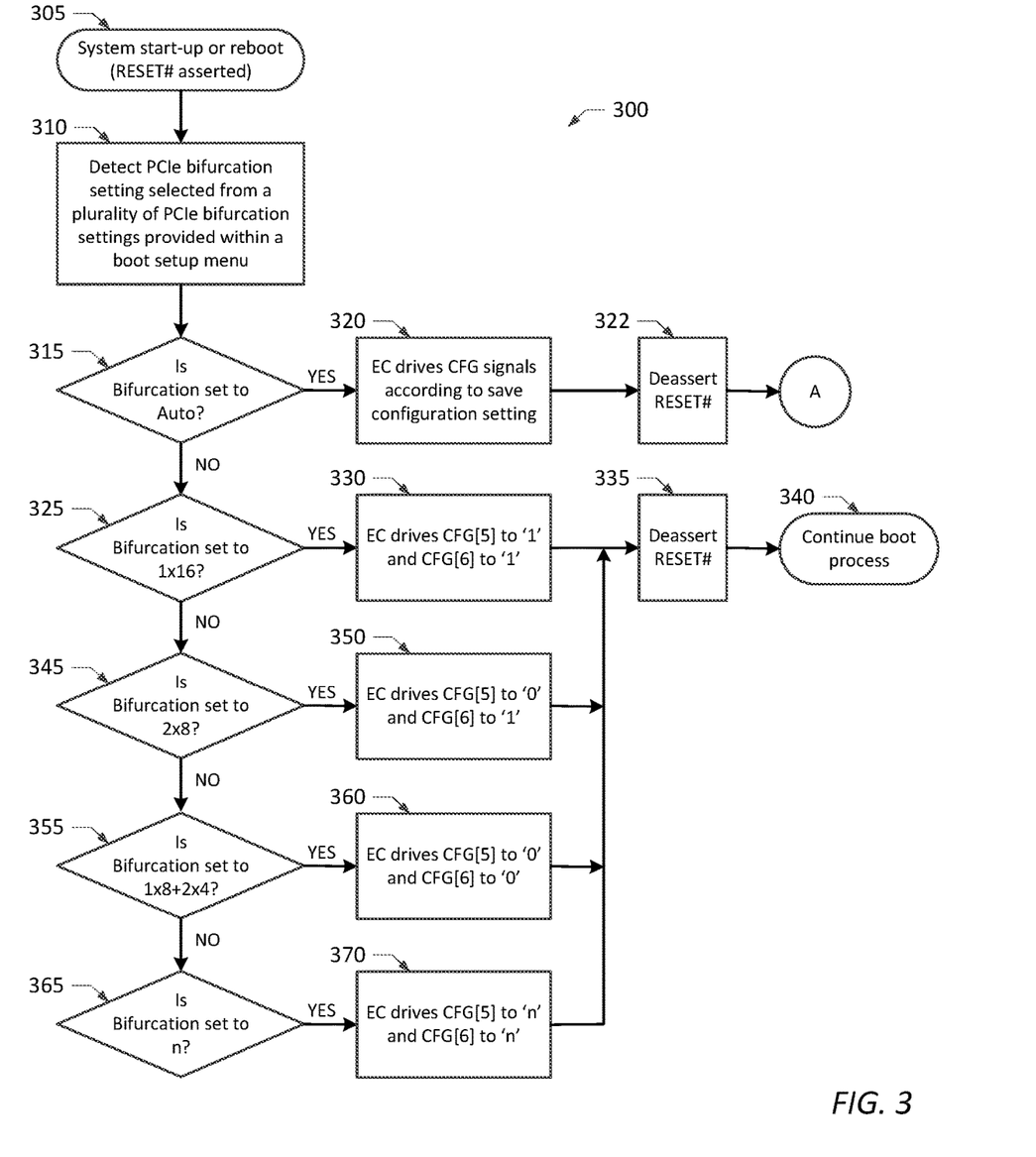
FIG. 3 is a flowchart diagram illustrating one embodiment of a computer-implemented method to configure a PCIe port according to one of the user-selectable PCIe bifurcation settings provided in the boot setup menu shown in FIG. 2.

FIG. 3 illustrates one embodiment of a method 300 that may be performed by at least one processing device of an information handling system (IHS) during an IHS boot process to detect a user-selectable PCIe bifurcation setting and configure at least one PCIe port provided within the IHS in accordance with the user-selectable PCIe bifurcation setting. In one embodiment, the EC 150 shown in FIG. 1 may execute program instructions within EC firmware 157 to perform the method steps shown in FIG. 3. It is noted, however, that method 300 is not strictly limited to such an embodiment, and can be implemented by another IHS processing device (e.g., a microcontroller) executing other program instructions, in other embodiments.

The method shown in FIG. 3 is a computer implemented method 300, which may be performed by hardware, software and/or firmware components of an information handling system. In one respect, the computer implemented method 300 shown in FIG. 3 improves how a client system (e.g., a desktop PC or a mobile PC) functions by enabling PCIe ports to be configured in accordance with user-selectable PCIe bifurcation settings, instead of the static and inflexible hardware solutions (e.g., resistors, jumpers or DIP switches) that are typically used within client systems to configure PCIe bifurcation.

According to one embodiment, method 300 may generally begin (in step 305) when an information handling system (e.g., IHS 100 of FIG. 1) is powered on or rebooted to begin an IHS boot process. When an IHS is powered on or rebooted, the RESET# signal is asserted to keep the platform controller hub and host processor in reset, while the embedded controller executes a boot block to begin the boot process. In addition to the boot block, the embedded controller may execute firmware (e.g., EC firmware 157) early in the boot process to detect a PCIe bifurcation setting selected from a plurality of PCIe bifurcation settings provided within a boot setup menu (in step 310). The BIOS setup menu 200 shown in FIG. 2 provides examples of PCIe bifurcation settings that may be selected, for example by a user, and detected in step 310.

In step 315, method 300 determines if the PCIe bifurcation setting is set to Auto. If the Auto setting is selected (YES branch of step 315), the embedded controller drives the configuration (CFG) signals used to configure the PCIe port according to a saved configuration setting (in step 320), de-asserts the RESET# signal (in step 322) and proceeds to the auto-bifurcation method shown in FIGS. 4 and 5. In some embodiments, the saved configuration setting may be stored as a bifurcation variable within a NVRAM coupled to, or provided within, the embedded controller.

In step 325, method 300 determines if the PCIe bifurcation setting is set to 1×16. If the "1×16" setting is selected (YES branch of step 325), the embedded controller supplies the appropriate configuration (CFG) signals needed to configure the PCIe port as an ×16 port (in step 330). In one example, the embedded controller may supply logic '1' values to the CFG[5] and CFG[6] pins provided on the PCIe interface 110 of host processor 102 to configure the PCIe port 124 as an ×16 port (in step 330). After the appropriate configuration signals are applied, the RESET# signal may be de-asserted (in step 335) and the host processor (e.g., CPU) may begin fetching code to continue the boot process (in step 340).

In step 345, method 300 determines if the PCIe bifurcation setting is set to 2×8. If the "2×8" setting is selected (YES branch of step 345), the embedded controller supplies the appropriate configuration (CFG) signals needed to configure the PCIe port as two (2) ×8 ports (in step 350). In one example, the embedded controller may supply a logic '0' value to the CFG[5] pin and a logic '1' value to the CFG[6] pin of the PCIe interface 110 to bifurcate the PCIe port 124 into two (2) ×8 ports (in step 350). After the appropriate configuration signals are applied, the RESET# signal may be de-asserted (in step 335) and the host processor (e.g., CPU) may begin fetching code to continue the boot process (in step 340).

In step 355, method 300 determines if the PCIe bifurcation setting is set to 1×8+2×4. If the "1×8+2×4" setting is selected (YES branch of step 355), the embedded controller supplies the appropriate configuration (CFG) signals needed to configure the PCIe port as one (1) ×8 port and two (2) ×4 ports (in step 360). In one example, the embedded controller may supply logic '0' values to the CFG[5] and CFG[6] pins of the PCIe interface 110 to bifurcate the PCIe port 124 into one (1) ×8 port and two (2) ×4 ports (in step 360). After the appropriate configuration signals are applied, the RESET# signal may be de-asserted (in step 335) and the host processor (e.g., CPU) may begin fetching code to continue the boot process (in step 340).

In step 365, method 300 determines if the PCIe bifurcation setting is set to n. If the "n" setting is selected (YES branch of step 365), the embedded controller supplies the appropriate configuration (CFG) signals needed to configure the PCIe port as n ports (in step 370). In one example, the embedded controller may supply logic 'n' values to the CFG[5] and CFG[6] pins of the PCIe interface 110 to bifurcate the PCIe port 124 into n ports (in step 360). After the appropriate configuration signals are applied, the RESET# signal may be de-asserted (in step 335) and the host processor (e.g., CPU) may begin fetching code to continue the boot process (in step 340).

Figure 4:
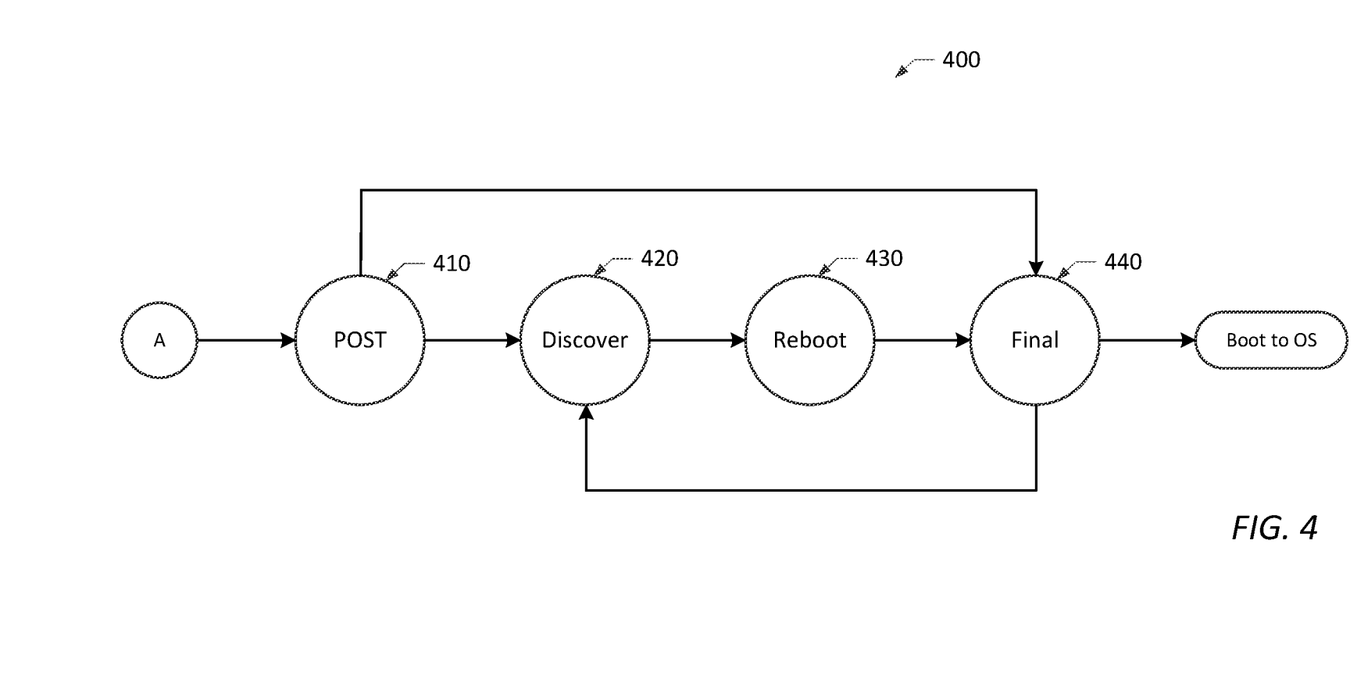
FIG. 4 illustrates one embodiment of a state machine that may be used to automatically configure a PCIe port when the "Auto" setting is selected in the boot setup menu shown in FIG. 2.

FIG. 4 illustrates one embodiment of a state machine 400 that may be used to automatically bifurcate a PCIe port when the "Auto" setting is selected in the BIOS setup menu 200. The auto-bifurcation state machine 400 shown in FIG. 4 includes four states: a POST state 410, a Discover state 420, a Reboot state 430 and a Final state 440. The auto-bifurcation state machine 400 enters the POST state 410 after an information handling system (IHS) is powered on (or rebooted) and the method 300 shown in FIG. 3 is performed.

When set to the POST state 410, the auto-bifurcation state machine 400 detects and enumerates all PCIe cards/devices provided within the system, and determines if a bifurcation variable exists. In some embodiments, a bifurcation variable may be stored within NVRAM to specify which PCIe adapter cards are installed within the system, which PCIe ports are populated with PCIe adapter cards and what bifurcation configuration settings are used to configure at least one of the PCIe ports. If a bifurcation variable exists, the auto-bifurcation state machine 400 may proceed to the Final state 440. If a bifurcation variable does not exist (e.g., if the IHS is being booted for the very first time, or if the IHS was reset to factory defaults), the auto-bifurcation state machine 400 may proceed to the Discover state 420.

When set to the Discover state 420, the auto-bifurcation state machine 400 discovers the PCIe ports provided within the system and determines the bifurcation requirements of any PCIe adapter cards connected to those ports. After the Discover state 420, the auto-bifurcation state machine 400 proceeds to the Reboot state 430 and reboots the information handling system.

When set to the Reboot state 430, the auto-bifurcation state machine 400 discovers the PCIe ports provided within the system, determines the bifurcation requirements of the PCIe adapter cards connected to those ports, creates a bifurcation variable and sends the bifurcation variable to an embedded controller of the IHS. The bifurcation variable may be stored within NVRAM and may contain information about the PCIe ports, the PCIe adapter cards connected to the PCIe ports, and the configuration settings used to configure at least one of the PCIe ports based on the bifurcation requirements. After the Reboot state 430, the auto-bifurcation state machine 400 proceeds to the Final state 440.

When set to the Final state 440, the auto-bifurcation state machine 400 determines if the bifurcation requirements of the PCIe adapter cards connected to the at least one PCIe port have changed. If the bifurcation requirements have changed, the auto-bifurcation state machine 400 is reset to the Discover state 420. If the bifurcation requirements have not changed, the system continues booting to the OS.

Figure 5:
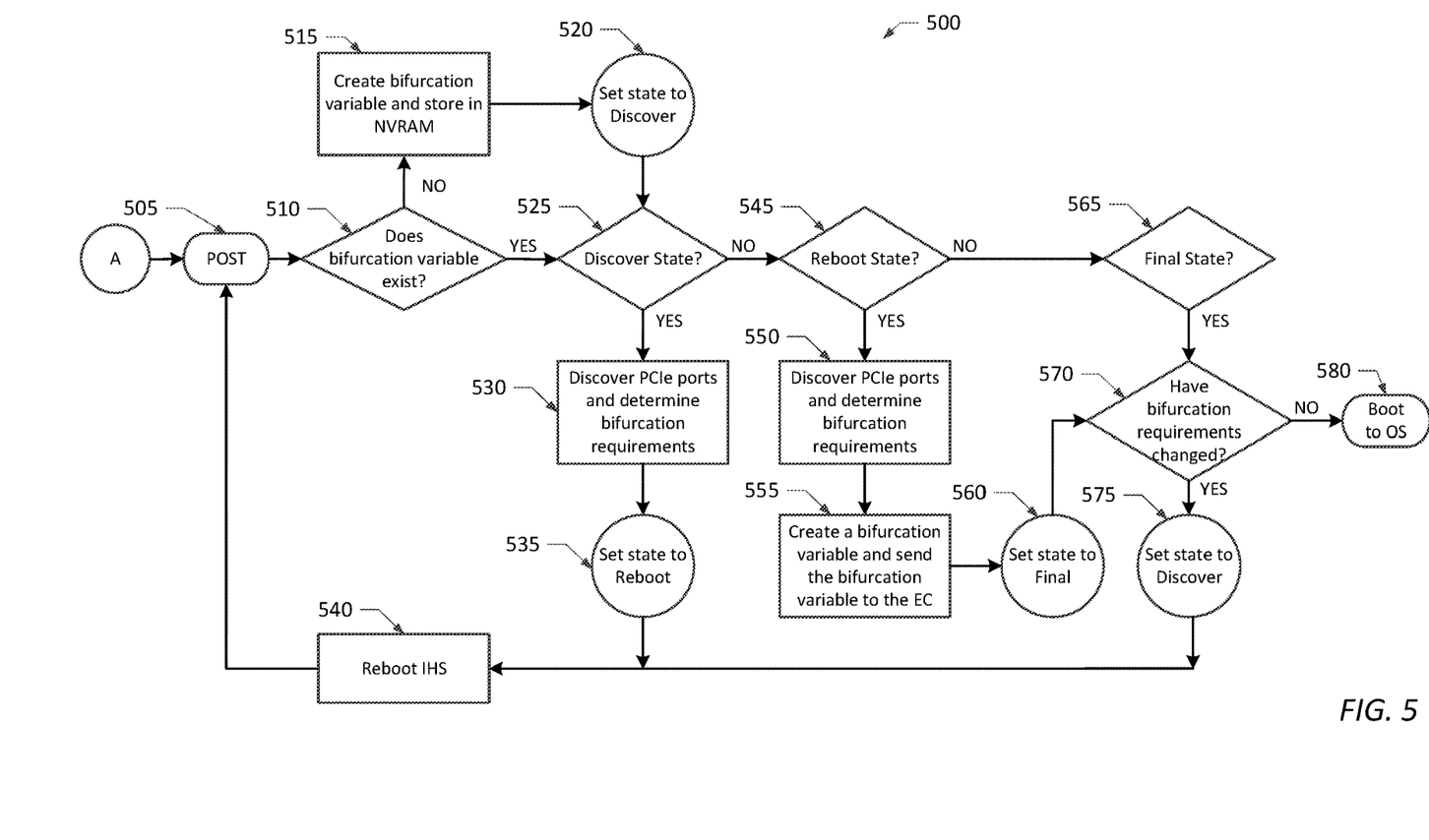
FIG. 5 is a flowchart diagram illustrating one embodiment of a computer-implemented method to auto-bifurcate a PCIe port when the "Auto" setting is selected in the boot setup menu shown in FIG. 2.

FIG. 5 illustrates one embodiment of a method 500 that may be performed by at least one processing device of an information handling system (IHS) during an IHS boot process to detect changes in the bifurcation requirements of PCIe adapter card(s) connected to at least one PCIe port provided within the IHS, and to automatically reconfigure the at least one PCIe port based on the changes made to the bifurcation requirements. In one embodiment, the host processor 102 shown in FIG. 1 may execute program instructions within boot firmware 142 to perform the method steps shown in FIG. 5. It is noted, however, that method 500 is not strictly limited to such an embodiment, and can be implemented by another IHS processing device (e.g., an embedded controller, a microcontroller or another processing device) executing other program instructions, in other embodiments.

The method shown in FIG. 5 is a computer implemented method 500, which may be performed by hardware, software and/or firmware components of an information handling system. In one respect, the computer implemented method 500 shown in FIG. 5 improves how server and client systems function by automatically reconfiguring PCIe ports when bifurcation requirements change without user intervention.

According to one embodiment, method 500 may be performed after an information handling system is powered on (or rebooted) and the method 300 shown in FIG. 3 is performed. As shown in FIG. 5, method 500 may generally begin by performing a Power-On Self-Test (POST) in step 505 and determining if a bifurcation variable exists in step 510. If a bifurcation variable does not exist (NO branch of step 510), method 500 creates a bifurcation variable for the information handling system, stores the bifurcation variable in NVRAM and sets the auto-bifurcation state machine 400 shown in FIG. 4 to the Discover state in steps 415 and 420. If a bifurcation variable does exist (YES branch of step 510), method 500 determines if the auto-bifurcation state machine 400 is set to the Discover state (in step 525), the Reboot state (in step 545) or the Final state (in step 565).

If the Discover state is set (YES branch of step 525), method 500 discovers the PCIe ports provided within the system and determines the bifurcation requirements of any PCIe adapter cards connected to those ports (in step 530). Next, method 500 sets the auto-bifurcation state machine 400 to the Reboot state 430 (in step 535) and reboots the information handling system (in step 540).

If the Reboot state is set (YES branch of step 545), method 500 discovers the PCIe ports provided within the system and determines the bifurcation requirements of any PCIe adapter cards connected to those ports (in step 550). Next, method 500 creates a bifurcation variable and sends the bifurcation variable to an embedded controller (in step 555). As noted above, the bifurcation variable may contain information about the PCIe ports, the PCIe adapter card(s) connected to the PCIe ports and a configuration setting used to configure at least one of the PCIe ports based on the bifurcation requirements. In some embodiments, method 500 may send a mailbox command to the embedded controller (in step 555), wherein the mailbox command contains the bifurcation variable. Once received by the embedded controller, the bifurcation variable may be stored in NVRAM, so that it is accessible to the embedded controller at the next system boot during the early pre-boot phase (i.e., when the PCH and CPU are in reset). After the bifurcation variable is sent to the embedded controller (in step 555), method 500 sets the auto-bifurcation state machine 400 to the Final state (in step 560).

If the Final state is set (YES branch of step 565), method 500 determines if the bifurcation requirements of the PCIe adapter card(s) connected to the at least one PCIe port have changed (in step 570). If the bifurcation requirements have changed (YES branch of step 570), method 500 resets the auto-bifurcation state machine 400 to the Discover state (in step 575) and reboots the information handling system (in step 540). If the bifurcation requirements have not changed (NO branch of step 570), method 500 continues booting to the OS (in step 580).

The systems and methods disclosed herein provide a novel solution for PCIe bifurcation support on both server and client systems. The novel solution disclosed herein requires a partnership between hardware, BIOS and the embedded controller to achieve the auto-bifurcation functionality described above. The hardware role is fulfilled by connecting the embedded controller's GPIO pins to the PCIe bifurcation configuration (CFG) pins (e.g., CFG[5] and CFG[6] pins) of the PCIe interface 110 provided within the host processor 102. By using the embedded controller to drive the CFG signals, rather than the standard approach of using pull up/pull down resistors, jumpers or DIP switches to statically set these signals, the solution disclosed herein is capable of intelligently customizing these configuration signals supplied to the CFG pins, while ensuring that the configuration signals are set before the PCH and CPU exit RESET#.

The BIOS recognizes the PCIe adapter cards installed within the system during the early boot phase (e.g., during the DXE phase), and sends a command (e.g., a mailbox command) to the embedded controller to request proper configuration of the CFG signals based on the installed PCIe adapter cards. In addition, BIOS provides the option for a user to select or specify a particular PCIe bifurcation configuration from the BIOS setup menu shown and described herein.

The embedded controller receives the command from the BIOS and drives the CFG signals, as required, to support the current configuration of installed PCIe adapter cards. At each system boot, the embedded controller drives the CFG signals based on the PCIe bifurcation setting selected from the BIOS setup menu and/or the saved configuration setting used in the last system boot. If the user selects a particular PCIe bifurcation setting from the BIOS setup menu, that setting is applied and the system proceeds to booting the OS. If the user selects the "Auto" setting, the embedded controller begins driving the CFG signals according to the last saved configuration setting (i.e., the bifurcation configuration used in the last system boot). By saving the configuration setting from the last system boot, boot time is minimized by performing the auto-bifurcation algorithm only when changes are made to the installed PCIe adapter cards. If BIOS detects a change in the installed PCIe adapter cards, BIOS communicates this change to the embedded controller, and the system is rebooted to enable the embedded controller to drive the CFG signals according to the new bifurcation configuration setting.

The auto-bifurcation state machine 400 and related method 500 provides dynamic auto-bifurcation configuration boot-to-boot based on the PCIe adapter cards installed within the system. The disclosed state machine and related method improves upon conventional solutions provided within servers and within client systems, which cannot automatically adapt or modify PCIe bifurcation configuration when PCI adapter cards are added, removed or relocated to different PCIe ports.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device. For example, the method shown in FIG. 3 may be implemented as EC firmware 157 or other computer program instructions, which are stored within NVRAM 156 and executed by EC 150 of information handling system (IHS) 100. In addition, the method shown in FIG. 5 may be implemented as boot firmware 142 or other computer program instructions, which are stored within computer readable NV memory 140 and executed by at least one host processor 102 of IHS 100.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. An information handling system (IHS), comprising:
at least one Peripheral Component Interconnect Express (PCIe) port;
a host processor including a PCIe interface coupled to the at least one PCIe port, wherein configuration pins of the PCIe interface are configured to receive configuration signals for configuring a lane width of the at least one PCIe port; and
an embedded controller (EC) coupled to the configuration pins of the PCIe interface included within the host processor, wherein when the IHS is powered on or rebooted, the EC initiates a boot process for the IHS and executes program instructions early in the boot process before the host processor comes out of reset to detect a user-selectable PCIe bifurcation setting and supply the configuration signals to the configuration pins of the PCIe interface to configure the lane width of the at least one PCIe port in accordance with the user-selectable PCIe bifurcation setting.

2. The information handling system as recited in claim 1, wherein the information handling system is a client system.

3. The information handling system as recited in claim 1, wherein the information handling system is a server system.

4. An information handling system (IHS), comprising:
at least one Peripheral Component Interconnect Express (PCIe) port;
a host processor having a PCIe interface coupled to the at least one PCIe port, wherein configuration pins of the PCIe interface are configured to receive configuration signal for configuring the at least one PCIe port;
an embedded controller (EC) coupled to the configuration pins of the PCIe interface, wherein when the IHS is powered on or rebooted, the EC initiates a boot process for the IHS and executes program instruction; early in the boot process before the host processor comes out of reset to detect a user-selectable PCIe bifurcation setting and drive the configuration signals, which are supplied to the configuration pins of the PCIe interface to configure the at least one PCIe port in accordance with the user-selectable PCIe bifurcation setting; and
a non-volatile computer readable memory storing a boot setup menu comprising a plurality of user-selectable PCIe bifurcation settings, wherein the plurality of user-selectable PCIe bifurcation settings comprise multiple static PCIe bifurcation settings and one automatic PCIe bifurcation setting for configuring the at least one PCIe port.

5. The information handling system as recited in claim 4, wherein the at least one PCIe port is an ×16 port, and wherein the multiple static PCIe bifurcation settings comprise a 1×16 setting, a 2×8 setting and a 1×8+2×4 setting, wherein:
when the 1×16 setting is selected in the boot setup menu, the EC drives the configuration signals supplied to the configuration pins of the PCIe interface to configure the at least one PCIe port to its maximum lane width;
when the 2×8 setting is selected in the boot setup menu, the EC drives the configuration signals supplied to the configuration pins of the PCIe interface to bifurcate the at least one PCIe port into two ×8 ports; and
when the 1×8+2×4 setting is selected in the boot setup menu, the EC drives the configuration signals supplied to the configuration pins of the PCIe interface to bifurcate the at least one PCIe port into one ×8 port and two ×4 ports.

6. The information handling system as recited in claim 4, wherein when the automatic PCIe bifurcation setting is selected in the boot setup menu, the EC drives the configuration signals supplied to the configuration pins of the PCIe interface to configure the at least one PCIe port according to a saved configuration setting, which was used to configure the at least one PCIe port during a previous boot process.

7. The information handling system as recited in claim 6, wherein the saved configuration setting is stored within a non-volatile memory coupled to, or provided within, the EC.

8. The information handling system as recited in claim 6, wherein the non-volatile computer readable memory further stores boot firmware, wherein after the host processor comes out of reset, the host processor executes program instructions within the boot firmware to determine if at least one PCIe adapter card is connected to the at least PCIe port.

9. The information handling system as recited in claim 8, wherein when the automatic PCIe bifurcation setting is selected in the boot setup menu, the host processor executes further program instructions within the boot firmware to:
detect changes in bifurcation requirements of the at least one PCIe adapter card; and
automatically reconfigure the at least one PCIe port if changes are made to the bifurcation requirements of the at least one PCIe adapter card.

10. The information handling system as recited in claim 9, wherein if changes are made to the bifurcation requirements of the at least one PCIe adapter card, the boot firmware automatically reconfigures the at least one PCIe port by storing a new configuration setting within a non-volatile memory coupled to, or provided within, the EC.

11. The information handling system as recited in claim 10, wherein when the IHS is subsequently rebooted, the EC reads the new configuration setting stored within the non-volatile memory and drives the configuration signals, which are supplied to the configuration pins of the PCIe interface to configure the at least one PCIe port in accordance with the new configuration setting.

12. A computer-implemented method executed by an embedded controller of an information handling system (IHS), wherein the IHS further comprises a host processor and at least one Peripheral Component Interconnect Express (PCIe) port coupled to a PCIe interface provided within the host processor, and wherein the computer-implemented method comprises:
   detecting a PCIe bifurcation setting selected from a plurality of PCIe bifurcation settings provided in a boot setup menu; and
   supplying configuration signals to the PCIe interface provided within the host processor to configure a lane width of the at least one PCIe port in accordance with the selected PCIe bifurcation setting;
   wherein said detecting and said supplying are performed by the EC each time the IHS is booted before the host processor comes out of reset.

13. The computer-implemented method as recited in claim 12, wherein the information handling system is a client system or a server system.

14. A computer-implemented method executed by an embedded controller of an information handling system (IHS), wherein the IHS further comprise's a host processor and at least one Peripheral Component Interconnect Express (PCIe) port coupled to a PCIe interface provided within the host processor, and wherein the computer-implemented method comprises:
   detecting a PCIe bifurcation setting selected from a plurality of PCIe bifurcation settings provided in a boot setup menu; and
   supplying configuration signals to the PCIe interface to configure the at least one PCIe port in accordance with the selected PCIe bifurcation setting;
   wherein said detecting and said supplying are performed by the EC each time the IHS is booted before the host processor comes out of reset; and
   wherein the boot setup menu comprises multiple static PCIe bifurcation settings and one automatic PCIe bifurcation setting.

15. The computer-implemented method as recited in claim 14, wherein the multiple static PCIe bifurcation settings comprise a first bifurcation setting, a second bifurcation setting and a third bifurcation setting, wherein:
   when the first bifurcation is detected, the EC supplies the configuration signals to the PCIe interface to configure the at least one PCIe port to its maximum lane width;
   when the second bifurcation is detected, the EC supplies the configuration signals to the PCIe interface to bifurcate the at least one PCIe port into two ports; and
   when the third bifurcation is detected, the EC supplies the configuration signals to the PCIe interface to bifurcate the at least one PCIe port into three ports.

16. The computer-implemented method as recited in claim 14, wherein when the automatic PCIe bifurcation setting is detected, the EC supplies the configuration signals to the PCIe interface to configure the at least one PCIe part according to a saved configuration setting, which was used to configure the at least one PCIe part during a previous boot process.

17. A computer-implemented method executed by a host processor of an information handling system (IHS), wherein the IHS comprises at least one Peripheral Component Interconnect Express (PCIe) port coupled to a PCIe interface provided within the host processor, wherein the computer-implemented method is performed by the host processor after the host processor comes out of reset, and wherein the computer-implemented method comprises:
   discovering at least one PCIe port coupled to the PCIe interface of the host processor;
   determining bifurcation requirements of one or more PCIe adapter cards connected to the at least one PCIe port;
   determining if the bifurcation requirements of the one or more PCIe adapter cards have changed; and
   automatically reconfiguring the at least one PCIe port if changes are made to the bifurcation requirements of the one or more PCIe adapter cards.

18. The computer-implemented method as recited in claim 17, wherein said automatically reconfiguring the at least one PCIe port comprises creating a bifurcation variable containing a configuration setting, which is used by an embedded controller (EC) of the IHS to configure the at least one PCIe port based on the bifurcation requirements.

19. The computer-implemented method as recited in claim 18, wherein said automatically reconfiguring the at least one PCIe port further comprises sending the bifurcation variable to the EC for storage within a non-volatile memory coupled to, or provided within, the EC.

20. The computer-implemented method as recited in claim 19, wherein said automatically reconfiguring the at least one PCIe port further comprises rebooting the IHS, so that the EC reads the bifurcation variable stored within the non-volatile memory and supplies configuration signals to the PCIe interface to configure the at least one PCIe port in accordance with the configuration setting contained within the bifurcation variable.

* * * * *